United States Patent
Seo et al.

(10) Patent No.: US 6,610,796 B2
(45) Date of Patent: Aug. 26, 2003

(54) FLAME RETARDANT POLYBUTYLENETEREPHTHALATE RESIN

(75) Inventors: Young-Ik Seo, Kyunggi-Do (KR); Chung-Seock Kang, Kyunggi-Do (KR); Tae-Gun Choi, Kyunggi-Do (KR); Jun-Myoung Song, Seoul (KR)

(73) Assignee: Kolon Industries Inc., Kyunggi-do (KR)

( * ) Notice: Subject to any disclaimer, the term of this patent is extended or adjusted under 35 U.S.C. 154(b) by 0 days.

(21) Appl. No.: 10/089,455

(22) PCT Filed: Nov. 12, 2001

(86) PCT No.: PCT/KR01/01925

§ 371 (c)(1),
(2), (4) Date: May 10, 2002

(87) PCT Pub. No.: WO02/42374

PCT Pub. Date: May 30, 2002

(65) Prior Publication Data
US 2003/0139565 A1 Jul. 24, 2003

(30) Foreign Application Priority Data

Nov. 27, 2000 (KR) ......... 2000-70880
Jul. 2, 2001 (KR) ......... 2001/39217
Jul. 2, 2001 (KR) ......... 2001/39218

(51) Int. Cl.[7] ............... C08F 20/00; C08K 3/10
(52) U.S. Cl. .......... 525/444; 528/275; 528/279; 528/280; 528/281; 528/283; 528/285; 528/298; 528/302; 528/307; 528/308; 528/308.6; 528/287; 525/437; 524/408; 524/409; 524/413; 524/424; 524/425; 524/430; 524/431; 524/432; 524/433; 524/434; 524/436; 524/437; 524/442; 524/445; 524/449; 524/451; 524/777; 524/783; 524/784; 524/785; 524/786; 524/788; 524/791

(58) Field of Search .............. 528/275, 279, 528/280, 281, 283, 285, 287, 298, 302, 307, 308, 308.6, 398, 400; 525/437, 444; 524/408, 409, 413, 424, 425, 430, 431, 432, 433, 434, 436, 437, 442, 445, 449, 451, 777, 783, 784, 785, 786, 788, 791

(56) References Cited

U.S. PATENT DOCUMENTS 4,127,590 A  11/1978  Endo et al.
4,157,436 A  6/1979  Endo et al.

FOREIGN PATENT DOCUMENTS

EP  0 640 638 A2  3/1995
EP  0 648 809 A1  4/1995

*Primary Examiner*—Samuel A. Acquah
(74) *Attorney, Agent, or Firm*—Birch, Stewart, Kolasch & Birch, LLP

(57) ABSTRACT

Disclosed is a flame retardant polybutyleneterephthalate resin prepared be copolymerizing a phosphorus-based flame retardant represented by the following formula I and a butyleneterephthalate unit:

Formula I

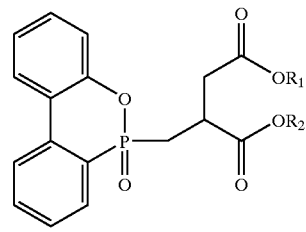

wherein $R_1$ and $R_2$ are different or the same and are methyl or butyl including a hydroxyl group.

26 Claims, No Drawings

FLAME RETARDANT POLYBUTYLENETEREPHTHALATE RESIN

This application is the national phase under 35 U.S.C. §371 of PCT International Application No. PCT/KR91/01925 which has an International filing date of Nov. 12, 2001, which designated the United States of America.

TECHNICAL FIELD

The present invention relates to a flame retardant polybutyleneterephthalate resin and, more particularly, to a non-halogen-based reaction type phosphorus-based fire retardant retardant and flame retardant polybutyleneterephthalate resin thereof applicable to the frame, housing, socket and connector of electric/electronic equipment or office machines.

BACKGROUND ART

In general, polybutyleneterephthalate is applied to the frame, housing, socket and connector of electric/electronic equipment, electric home appliances or office machines because of its excellent chemical resistance, appearance, mechanical properties and electric insulation. Polybutyleneterephthalate, which is useful for various types of products, is required to have fire retardancy for the use purpose in a wide range of applications, awhile fire retardancy is necessary to polyethyleneterephthalate only used for special cases such as fire retardant thread. However, polybutyleneterephthalate is susceptible to combustion in the air because of its limited oxygen index(LOI) being 23, and thus relatively poor in fire retardancy.

There are two known methods for providing fire retardancy to the polybutyleneterephthalate combustible in the air: the one is a blend method in which a fire retardant is added during preparation or molding of polybutyleneterephthalate; and the other is a copolymerization method in which a fire retardant is incorporated with a polybutyleneterephthalate unit through copolymerization.

The blend method utilizes a halogen-based fire retardant, a red phosphorus-based fire retardant, an antimony oxide compound, a phosphorus-based flame retardant, and hydrated metal oxide, which are used either alone or in combination of two or more. In the blend method, however, the flame retardant is slowly released from the product to deteriorate the flame retardancy and a large amount of flame retardant is required even in combination with a flame retardancy synergistic agent or a flame retardant assistant agent, resulting in deteriorated properties and raised costs. The halogen-based flame retardant readily produces a large amount of halogen compounds, especially, halogenated dioxin, which is at issue in recent years. The red phosphorus-based fire retardant is also not an environment-friendly compound because it produces toxic phosphine gas.

Conventionally, halogen compounds having an ester-forming group or phosphorus compound are known as a flame retardant that can be used in the copolymerization method. Especially, phosphorus compounds are superior to halogen compounds in that they have excellent light resistance and hardly produce halogenated compounds such as halogenated dioxin during combustion.

The phosphorus compounds are known to be of a polyester copolymerization type. As disclosed in U.S. Pat. No. 4,157,436, the phosphorus compounds can be used in the preparation of copolymer type flame retardant polybutyleneterephthalate without any problem but cause many problems in the preparation of polybutyleneterephthalate. More specifically, the use of the phosphorus compound in the preparation of polybutyleneterephthalate may deteriorate the polymerization reactivity and cause a reaction of the phosphorus compound and the polymerization catalyst to form a gel and hence deteriorate the catalytic activity of the catalyst. The phosphorus compound also reacts with a diol component of the material, 1,4-butanediol to yield tetrahydrofuran and water, which deteriorate the polymerization rate and prevent the progress of the polymerization reaction. Hence there is no report on the preparation of copolymerization type flame retardant polybutyleneterephthalate.

Unlike the case of polyethyleneterephthalate, the choice of a flame retardant and the polymerization conditions are of great significance in the preparation of flame retardant polybutyleneterephthalate that has excellent flame retardancy, properties and environment-friendly property.

Recently, major electric/electronic companies in Japan are restraining the use of halogen-based flame retardant polybutyleneterephthalate and expect an alternative of the red phosphorus-based flame retardant polybutyleneterephthalate which is still used in many companies. The Japanese government is planning to restrict the use of halogen- or red phosphorus-based flame retardant polybutyleneterephthalate. Furthermore, the use of polybrominated biphenyl, decaphenyl, octaphenyl and pentaphenyl is legally restricted in German and Holland. Nevertheless, halogen- or red phosphorus-based flame retardant polybutyleneterephthalate is still in use, since there is no substitute available in the market.

DISCLOSURE OF INVENTION

It is an object of the present invention to solve the problems in preparation of polybutyleneterephthalate using the copolymerization method and to provide a polybutyleneterephthalate resin that is incorporated with an economical and environment-friendly non-halogen-based flame retardant containing no halogen and prepared by copolymerization of a phosphorus-based flame retardant and a butyleneterephthalate unit to have good flame retardancy and remarkably improved properties.

It is another object of the present invention to provide a polybutyleneterephthalate resin in which a deterioration of crystallization rate caused by the use of the phosphorus-based flame retardant is avoidable.

It is further another object of the present invention to provide a polybutyleneterephthalate resin in which a deterioration of mechanical properties caused by the use of the additive type phosphorus-based flame retardant is avoidable.

To achieve the objects of the present invention, there is provided a flame retardant polybutyleneterephthalate resin being prepared by: (a) performing a transesterification reaction of a dicarboxylic acid or its ester derivative and a 1,4-butanediol to yield a oligomer; (b) adding the oligomer with 0.5 to 30 parts by weight of a phosphorus-based flame retardant represented by the following formula I with respect to 100 parts by weight of the dicarboxylic acid or its ester derivative; and (c) reacting a polycondensation reaction in the presence of a polycondensation catalyst to prepare a polybutyleneterephthalate:

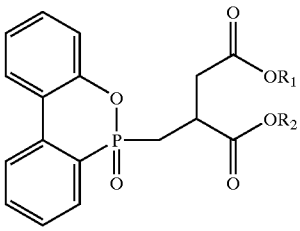

Formula I wherein $R_1$ and $R_2$ are same or different and are methyl or butyl including a hydroxyl group.

In another aspect of the present invention, the flame retardant polybutyleneterephthalate resin further comprises a deposited particle-forming material or an inorganic particle material incorporated during the polymerization reaction or after the preparation of the resin lest incorporation of the phosphorus-based flame retardant having the formula I should impair the crystallization rate.

In further another aspect of the present invention, the flame retardant polybutyleneterephthalate resin further comprises a reinforcing material, which is added to the polybutyleneterephthalate resin obtained using the phosphorus-based flame retardant having the formula I.

Now, the present invention will be described in further detail as follows.

The flame retardant polybutyleneterephthalate of the present invention is prepared by reacting dicarboxylic acid or its ester derivative with 1,4-butanediol as starting materials to produce an oligomer, adding 0.5 to 30 parts by weight of the phosphorus-based flame retardant represented by the formula I to the oligomer with respect to 100 parts by weight of the dicarboxylic acid or its ester derivative, and adding a polycondensation catalyst.

Conventionally, a blending method of incorporating a large amount of a red phosphorus type compound as a flame retardant has been adapted to make polybutyleneterephthalate show flame retardancy. In this case, the flame retardant is simply dispersed in the polymer to result in a deterioration of flame retardancy and properties. So, the blending method requires a large amount of the flame retardant or additionally a flame retardant assistant agent.

Only if the phosphorus compound exists in the polymer chain, polybutyleneterephthalate can be more excellent in flame retardancy with a smaller amount of the flame retardant than incorporated by blending. Accordingly, the present invention incorporates a reactive phosphorus-based flame retardant during the melt polymerization in the preparation of a flame retardant polybutyleneterephthalate resin so as to copolymerize the flame retardant in the polymer chain.

Under most conditions, the use of the phosphorus-based flame retardant is problematic in that the polymerization reaction is hard to process due to deteriorated catalyst activity, caused by the phosphorus-based flame retardant, and formation of by-products such as tetrahydrofuran. On the contrary, the present invention solves the problem by copolymerization reaction using the phosphorus-based flame retardant represented by the formula I.

Dicarboxylic acid or its ester derivative that is the principal starting material in the preparation of the flame retardant polybutyleneterephthalate resin of the present invention may be a mixture of two compounds comprising an aromatic dicarboxylic acid selected from terephthalic acid, 2,6-naphthalenedicarboxylic acid, isophthalic acid, phthalic acid and 5-sodium sulfone isophthalic acid, or its ester derivative; and an alicyclic dicarboxylic acid selected from 1,4-cyclohexanedicarboxylic acid and 1,3-cyclohexanedicarboxylic acid, or its ester derivative. Preferably, more than 99 mol % of terephthalic acid or its ester derivative is used in preparation of polybutyleneterephthalate.

Starting materials, i.e., the above-mentioned dicarboxylic acid or its ester derivative and a 1,4-butanediol compound undergo esterification or transesterification to yield an oligomer. Following addition of a phosphorus-based flame retardant represented by the formula I, the oligomer is polymerized in the presence of a polycondensation catalyst at high temperature under vacuum to prepare polybutyleneterephthalate.

When the added amount of the phosphorus-based flame retardant represented by the formula I exceeds 30 parts by weight with respect to 100 parts by weight of the dicarboxylic acid or its ester derivative, the polymerization rate is dropped and the polybutyleneterephthalate thus obtained has an extremely low intrinsic viscosity. According to the present invention, a high-viscosity flame retardant polybutyleneterephthalate can be prepared without a deterioration of the polymerization rate by controlling the type of the catalyst and the addition time of the catalyst and the phosphorus-based flame retardant represented by the formula I.

The content of the phosphorus-based flame retardant represented by the formula I is preferably in the range of 0.5 to 30 parts by weight with respect to 100 parts by weight of the dicarboxylic acid or its ester derivative, most preferably in the range of 1 to 15 parts by weight.

After the completion of the transesterification reaction using the dicarboxylic acid or its ester derivative and a 1,4-butanediol compound as starting materials, the phosphorus-based flame retardant represented by the formula I is added to the reaction mixture and, after less than 2 hours of reaction, the reaction mixture undergoes the polymerization reaction in the presence of a polycondensation catalyst to prepare flame retardant polybutyleneterephthalate.

The transesterification catalyst as used herein may include at least one selected from metal acetates, such as manganese acetate, zinc acetate, cobalt acetate, magnesium acetate, sodium acetate and lithium acetate; metal hydroxides, such as manganese hydroxide, zinc hydroxide, cobalt hydroxide, calcium hydroxide, magnesium hydroxide and sodium hydroxide; and tetraalkyltitanate having a $C_2$–$C_6$ alkyl substituent, which are used either alone or in combination of two or more.

The polycondensation catalyst as used herein may include at least one compound selected from metal oxides, such as antimony oxide, tin oxide or germanium dioxide; tetraalkyltitanate having a $C_2$–$C_6$ alkyl substituent; and metal acetates, such as manganese acetate, zinc acetate, cobalt acetate, magnesium acetate, sodium acetate or lithium acetate, which are used either alone or in combination of two or more.

Due to selection of the phosphorus-based flame retardant represented by the formula I and adequate catalysts and optimized reaction conditions, the flame retardant polybutyleneterephthalate thus obtained contains 0.3 to 5 wt. % of phosphorus atom in the polymer so as to have flame retardancy without a deterioration of crystallinity and processability.

When the polybutyleneterephthalate incorporated with the polymerization type flame retardant of the formula I has the same intrinsic viscosity as homo-polybutyleneterephthalate, it may have a deterioration of the mechanical properties such as Izod impact strength, tensile strength or bending strength due to the bulky copolymer component.

To solve this problem, the present invention may incorporate a reinforcing material such as glass-reinforced fiber or carbon fiber into the polybutyleneterephthalate resin.

In particular, the incorporation of a reinforcing material enhances the mechanical properties most effectively when the polybutyleneterephthalate resin has an notched Izod impact strength of more than 3 kg·cm/cm, a tensile strength of more than 400 kg/cm$^2$ and a flexual strength of more than 800 kg/cm$^2$.

Preferably, the added amount of the reinforcing material incorporated into the polybutyleneterephthalate resin is in the range of 10 to 50 wt. % with respect to 50 to 90 wt. % of the polybutyleneterephthalate resin.

If the content of the reinforcing material is less than 10 wt. % in the entire polybutyleneterephthalate composition, the incorporation of the reinforcing material hardly enhances the mechanical properties. Otherwise, if the content of the reinforcing material exceeds 50 wt. %, there is a problem in regard to processability during injection molding.

The flame retardant resin obtained by incorporation of the reinforcing material has a notched Izod impact strength of more than 4 kg·cm/cm, a tensile strength of more than 500 kg/cm$^2$ and a flexual strength of more than 1,000 kg/cm$^2$, in which case it may be adapted to various applications such as the frame, housing, socket or connector of electric/electronic equipment or office machines.

The polybutyleneterephthalate resin composition incorporated with the reinforcing material may exhibit fire retardancy when the LOI is greater than 26.

According to the present invention, a deposited particle forming material or an inorganic particle material is added during the polycondensation reaction in order to prevent a possible deterioration of the crystallization rate of the polybutyleneterephthalate obtained by using the phosphorus-based flame retardant represented by the formula I.

If the content of the phosphorus-based flame retardant represented by the formula I exceeds 5 parts by weight with respect to 100 parts by weight of the starting material dicarboxylic acid or its ester derivative, the flame retardant polybutyleneterephthalate has a remarkable deterioration of the crystallization rate relative to the homo-polybutyleneterephthalate.

To avoid the deterioration of the crystallization rate, a deposited particle-forming material is used to form internal particles during the polymerization reaction, or an inorganic particle material is used during the polymerization reaction or after the preparation of the resin.

Fine inactive particles formed by the deposited particle-forming material or the inorganic particle material acts as a nucleating agent in the resin to enhance the crystallization rate.

Formation of internal particles by the deposited particle-forming material is practicable by incorporation of a metal compound, for example, metal acetate or metal oxide with a phosphorus compound added during the polycondensation reaction. The metal acetate can be used as the above-mentioned transesterification and polycondensation catalyst, and specifically includes manganese acetate, zinc acetate, cobalt acetate. Magnesium acetate, sodium acetate, or lithium acetate, The metal oxide as used herein may include antimony oxide, tin oxide, germanium dioxide, or tetrabutyl titanate. The phosphorus compound as used herein may include trimethyl phosphate.

Preferably, the content of the deposited particle-forming material is in the range of 0.001 to 5 wt. % in the resin composition. If the content of the deposited particle-forming material is less than 0.001 wt. %, the crystallization rate is hardly enhanced otherwise, if it exceeds 5 wt. %, the reverse reaction occurs during the polycondensation reaction of the a resin to deteriorate the properties of the resin.

Specific examples of the inorganic particle material used herein may include at least one selected from titanium dioxide, calcium carbonate, talc, clay, mica, aluminum silicate, silica, calcium metasilicate and alumina trihydrate, which are used either alone or in combination of two or more. Preferably, the inorganic particles material have an average particle diameter of 0.1 to 100 μm. The inorganic particles having an average particle diameter of less than 0.1 μm are currently impossible to form, and those having an average particle diameter exceeding 100 μm have to be added in an extremely large amount to deteriorate the properties of the resin.

Preferably, the content of the inorganic particle material is in the range of 0.01 to 10 wt. % in the resin composition. If the content of the inorganic particle material less than 0.01 wt. %, the crystallization rate is hardly enhanced; otherwise, if it exceeds 10 wt. %, the properties of the resin deteriorate.

An analysis of the crystallization rate of the polybutyleneterephthalate resin incorporated with internal or external particles using a DSC7 (equipped with a cooler) thermal analyzer supplied by Perkin-Elmer Co. reveals that the polybutyleneterephthalate resin must have a recrystallization peak area of less than 9.0 J/g in order to have a crystallization rate that does not deteriorate the intrinsic properties of the polybutyleneterephthalate, and a melting peak area of more than 35 J/g to have a sufficiently high degree of crystallization.

The polybutyleneterephthalate resin exhibits good flame retardancy when the LOI used as a criterion in measurement of the flame retardancy exceeds 25.

As such, the incorporation of a phosphorus-based flame retardant during the polymerization reaction and additionally internal or external particles into the polybutyleneterephthalate resin provides flame retardancy without a deterioration of the crystallization rate of the polybutyleneterephthalate.

Of course, the present invention also incorporates a reinforcing material such as glass-reinforced fiber or carbon fiber into the polybutyleneterephthalate resin in order to enhance the mechanical properties of the polybutyleneterephthalate resin obtained by adding internal or external particles, e.g., notched Izod impact strength, tensile strength or bending strength.

BEST MODE FOR CARRYING OUT THE INVENTION

Hereinafter, the present invention will be described in detail by way of the following examples, which are not intended to limit the scope of the present invention.

EXAMPLE 1

0.029 part by weight of tetrabutyltitanate and 0.0062 part by weight of lithium acetate were added to 100 parts by weight of dimethylterephlhtlhalate and 65 parts by weight of 1,4-butanediol. The reaction mixture was subjected to a transesterification reaction at a raised temperature from 130° C. to 180° C. over 2 hours and a half to yield an oligomer. The oligomer thus obtained was reacted with 3 parts by weight of 9,10-dihydro-9-oxa-10-[2,3-di- (methoxycarboiyvl)propyl]-phosphaphenanthrene-10-oxide as a phosphorus-based flame retardant represented by the formula I. Following the reaction, 0.026 part by weight of tetrabutyltitanate and 0.0074 part by weight of lithium acetate were added to perform a polycondensation reaction at 255° C. with the pressure of less than 0.5 Torr for 3 hours to yield a flame retardant polybutyleneterephthalate having an intrinsic viscosity of 0.970.

The polybutyleneterephthalate resin was processed into a flame retardant sample by the UL method. The flame retardant sample had a molding shrinkage of less than 0.02% under normal molding conditions of polybutyleneterephthalate, and was ranked as UL94-V0 in flame retardancy.

EXAMPLE 2

The procedures were performed in the same manner as described in Example 1, excepting that 0.5 part by weight of 9,10-dihydro 9-oxa-10-[2,3-di-(methoxycarbonyl)propyl]-phosphaphenanthrene-10-oxide was added as a phosphorus-based flame retardant to prepare flame retardant polybutyleneterephthalate. The flame retardant polybutyleneterephthalate thus obtained had an intrinsic viscosity of 1.120 and was ranked as UL94-V2 in flame retardancy. The flame retardant polybutyleneterephthalate also had processability under the same conditions as polybutyleneterephthalate.

EXAMPLE 3

The procedures were performed in the same manner as described in Example 1, excepting that 25 parts by weight of 9,10-dihydro-9-oxa-10-[2,3-di-(methoxycarbonyl)propyl]-phosphaphenanthrene-10-oxide was added as a phosphorus-based flame retardant to prepare flame retardant polybutyleneterephthalate. The flame retardant polybutyleneterephthalate thus obtained had an intrinsic viscosity of 0.912 and was ranked as UL94-V0 in flame retardancy. The flame retardant polybutyleneterephthalate also had processability under the same conditions as polybutyleneterephthalate.

EXAMPLE 4

The procedures were performed in the same manner as described in Example 1, excepting that 10 parts by weight of 9,10-dihydro-9-oxa-10-[2,3-di-(hydroxybutoxycarbonyl)propyl]-phosphaphenanthrene-10-oxide was added as a phosphorus-based flame retardant represented by the formula I to prepare flame retardant polybutyleneterephthalate. The flame retardant polybutyleneterephthalate thus obtained had an intrinsic viscosity of 0.945 and was ranked as UL94-V0 in flame retardancy. The flame retardant polybutyleneterephthalate also had processability under the same conditions as polybutyleneterephthalate.

COMPARATIVE EXAMPLE 1

The procedures were performed in the same manner as described in Example 1, excepting that polybutyleneterephthalate was prepared without addition of a phosphorus-based flame retardant. The polybutyleneterephthalate thus obtained had an intrinsic viscosity of 0.98 and was ranked as UL94-HB in flame retardancy, which means that polybutyleneterephthalate exhibited no flame retardancy.

COMPARATIVE EXAMPLE 2

The procedures were performed in the same manner as described in Example 1, excepting that flame retardant polybutyleneterephthalate was prepared by adding 9,10-dihydro-9-oxo-10-[2,3-di-(hydroxyethoxycarbonyl)propyl]-phosphaplenanthrene-10-oxide known as a phosphorus-based flame retardant for polymerization type polyethyleneterephthalate. The flame retardant polybutyleneterephthalate thus obtained had an extremely low intrinsic viscosity of 0.432 and could not be used to fabricate a flame retardant sample.

COMPARATIVE EXAMPLE 3

The procedures were performed in the same manner as described in Example 1, excepting that polybutyleneterephthalate was prepared by adding 9,10-dihydro-9-oxa-10-[2,3-di-(hydroxycarbonyl)propyl]-phosphaphenanthrene-10-oxide known as a phosphorus-based flame retardant used for polymerization type polyethyleneterephthalate. Unlike the case of polyethyleneterephthalate, tetrahydrofuran and water were produced to decrease the polycondensation reactivity with a failure in preparation of flame retardant polybutyleneterephthalatc.

The properties of the polybutyleneterephthalates obtained in Examples 1 to 4 and Comparative Examples 1, 2 and 3 are presented in Tables 1 and 2.

The measurement of the properties were performed as follows:
1) Intrinsic Viscosity: Measured with a Ubbelode viscosimeter using a 0.5 g/dl solution of 60% phenol and 40% tetrachloroethane in a thermostatic bath at 30° C.
2) Tensile strength: ASTM D638
3) Flame retardancy: UL (Uderwriter's laboratory) 94 rod vertical combustion test method.
4) Melting point: Measured with a differential scanning thermal analyzer supplied from Perkin Elmer Co. The samples were dried under vacuum at 40° C. for 12 hours.

TABLE 1

|  | Example 1 | Example 2 | Example 3 | Example 4 | Comparative Example 1 |
|---|---|---|---|---|---|
| Phosphorus Flame Retardant Content (part by weight) | 3 | 0.5 | 25 | 10 | 0 |
| UL94 Vertical Combustion | V0 | V2 | V0 | V0 | HB |
| Intrinsic Viscosity | 0.970 | 1.120 | 0.912 | 0.945 | 0.981 |
| Melting Point (° C.) | 222 | 224 | 221 | — | 224 |
| Tensile Strength (kg/cm²) | 585 | 600 | 480 | — | 600 |

As can be seen from Table 1, the polybutyleneterephthalate incorporated with the phosphorus-based flame retardant of the formula I was excellent in flame retardancy.

TABLE 2

|  | PBT Intrinsic Viscosity |
|---|---|
| Example 1 | 0.970 |
| Example 4 | 0.945 |
| Comparative Example 2 | 0.432 |
| Comparative Example 3 | Non-measurable |

As can be seen from Table 2, the phosphorus compounds used for polyethylenetcrephthalate were inapplicable to polybutyleneterephthalate and only the phosphorus-based flame retardant of the formula I was useful in preparation of flame retardant polybutyleneterephthalate.

EXAMPLE 5

0.029 part by weight of tetrabutyltitanate and 0.0062 part by weight of lithium acetate were added to 100 parts by weight of dimethylterephthalate and 65 parts by weight of 1,4-butanediol. The reaction mixture was subjected to a transesterification reaction at a raised temperature from 130° C. to 180° C. over 2 hours and a half to yield an oligomel. The oligomer thus obtained was reacted with 3 parts by weight of 9,10-dihydro-9-oxa-10-[2,3-di-(methoxycarbonyl)propyl]-phosphaphenanithiene-10-oxide as a phosphorus-based flame retardant represented by the formula 1. Following the reaction, 0.026 part by weight of tetrabutyltitanate, 0.0074 part by weight of lithium acetate and 0.012 wt. % of trimethylphosphate were added to pertorm a polycondensation reaction at 255° C. with the pressure of less than 0.5 Torr for 3 hours to yield a flame retardant polybutyleneterephthalate having an intrinsic viscosity of 0.970. The polybutyleneterephthalate resin was analyzed in regard to limit oxygen index and crystallization rate according to the above-described methods. The results are presented in Table 2.

EXAMPLES 6 TO 14 AND COMPARATIVE EXAMPLES 4, 5 AND 6

The procedures were performed in the same manner as described in Example 5 to prepare polybutyleneterephthalate resins, excepting that the content of a phosphorus-based flame retardant, 9,10-dihydro-9-oxa-10-[2,3-di-(methoxycarbonyl) propy]-phosphaphenanthrene-10-oxide and that of the deposited particle-forming material or the inorganic particle materialwere varied as shown in Table 3. The polybutyleneterephthalate resins thus obtained were analyzed in regard to limit oxygen index and crystallization rate according to the above-described methods. The results are presented in Table 4.

The limit oxygen index and the crystallization rate of the resins were measured as follows:

1) Crystallization rate: Measured with a DSC7 (equipped with a cooler) thermal analyzer supplied by Perkin-Elmer Co. The resin was dried under vacuum at 150° C. for 4 hours. About 10 mg of the resin was heated at a raised temperature from 25° C. to 270° C. with an increasing rate of 10° C./min, kept at 270° C. for 3 minutes, and quenched on a DSC program at a rate of 300° C./min. The sample thus obtained is heated again at a raised temperature from 25° C. to 270° C. with an increasing rate of 10° C./min and analyzed in regard to recrystallization peak and melting peak values.

2) Limit oxygen index: ASTM D2863

TABLE 3

|  | Composition | | | | | Property |
|---|---|---|---|---|---|---|
|  | Content of Phosphorus Flame Retardant[1] | Deposited particle-forming material | | Organic Particle | | Intrinsic Viscosity |
|  |  | Type | Content | Type | Content | (dl/g) |
| Example 5 | 3 | Lithium Acetate | 0.0136 | Titanium Dioxide | 0 | 1.14 |
|  |  | Tetrabutyltitanate | 0.055 |  |  |  |
| Example 6 | 7 | Lithium Acetate | 0.0151 | Titanium Dioxide | 0 | 0.98 |
|  |  | Tetrabutyltitanate | 0.055 |  |  |  |
| Example 7 | 15 | Lithium Acetate | 0.151 | Titanium Dioxide | 0.2 | 0.68 |
|  |  | Tetrabutyltitanate | 0.055 |  |  |  |
| Example 8 | 7 | Lithium Acetate | 0.0113 | Titanium Dioxide | 0.1 | 0.98 |
|  |  | Tetrabutyltitanate | 0.055 |  |  |  |
| Example 9 | 10 | Lithium Acetate | 0.0113 | Titanium Dioxide | 0.2 | 0.88 |
|  |  | Tetrabutyltitanate | 0.055 |  |  |  |
| Example 10 | 7 | Lithium Acetate | 0.0098 | Mica | 0.2 | 0.97 |
|  |  | Manganese Acetate | 0.0052 |  |  |  |
|  |  | Tetrabutyltitanate | 0.055 |  |  |  |
| Example 11 | 7 | Zinc Acetate | 0.0089 | Silica | 0.2 | 0.99 |
|  |  | Magnesium Acetate | 0.0124 |  |  |  |
|  |  | Tetrabutyltitanate | 0.055 |  |  |  |
| Example 12 | 7 | Magnesium Acetate | 0.0242 | Clay | 0.2 | 0.96 |
|  |  | Antimony Oxide | 0.0098 |  |  |  |
|  |  | Tetrabutyltitanate | 0.055 |  |  |  |
| Example 13 | 7 | Lithium Acetate | 0.0151 | Talc | 0.2 | 0.96 |
|  |  | Germanium Oxide | 0.0077 |  |  |  |
|  |  | Tetrabutyltitanate | 0.055 |  |  |  |
| Example 14 | 7 | Lithium Acetate | 0.0151 | Talc | 0.2 | 0.93 |
|  |  | Germanium Oxide | 0.0077 |  |  |  |
|  |  | Tetrabutyltitanate | 0.055 |  |  |  |
| Comparative Example 4 | 0 | Lithium Acetate | 0.0136 | Titanium Dioxide | 0 | 0.99 |
|  |  | Tetrabutyltitanate | 0.055 |  |  |  |

TABLE 3-continued

| | Composition | | | | | Property |
|---|---|---|---|---|---|---|
| | Content of Phosphorus Flame Retardant[1] | Deposited particle-forming material | | Organic Particle | | Intrinsic Viscosity |
| | | Type | Content | Type | Content | (dl/g) |
| Comparative Example 5 | 0.2 | Lithium Acetate Tetrabutyltitanate | 0.0113 0.055 | Titanium Dioxide | 0 | 1.12 |
| Comparative Example 6 | 35 | Lithium Acetate Tetrabutyltitanate | 0.0113 0.055 | Titanium Dioxide | 0 | 0.51 |

Note:
[1]unit: part by weight with respect to dicarboxylic acid

TABLE 4

| | Limit Oxygen Index (LOI) | Recrystallization Peak Area (J/g) | Melting Peak Area (J/g) |
|---|---|---|---|
| Example 5 | 25 | 0.13 | 49 |
| Example 6 | 26 | 3.54 | 50 |
| Example 7 | 29 | 7.25 | 44 |
| Example 8 | 26 | 2.89 | 51 |
| Example 9 | 27 | 5.44 | 47 |
| Example 10 | 26 | 3.77 | 49 |
| Example 11 | 26 | 3.54 | 50 |
| Example 12 | 26 | 3.69 | 52 |
| Example 13 | 26 | 3.59 | 51 |
| Example 14 | 26 | 3.44 | 52 |
| Comparative Example 4 | 23 | 0.00 | 48 |
| Comparative Example 5 | 23 | 0.1 | 50 |
| Comparative Example 6 | 31 | 12.31 | 32 |

As can be seen from Table 4 the polybutyleneterephthalate resins obtained in Comparative Examples 4 and 5 must have a recrystallization peak area of less than 9.0 J/g in order to have a crystallization rate that does not deteriorate the intrinsic properties of the polybutyleneterephthalate, and a melting peak area of more than 35 J/g to have a sufficiently high decree of crystallization. Furthermore, those polybutyleneterephthalate resins hardly meet a requirement of the limit oxygen index that must be greater than 25.

EXAMPLES 15 AND 16 AND COMPARATIVE EXAMPLES 7 AND 8

The procedures wvere performed in the same manner as described in Example 1 to prepare polybutyleneterephthalate resins, excepting that the content of a phosphorus-based flame retardant, 9,10-dihydro-9-oxa-10-[2,3-di-(methoxycarbonyl)propyl]-phosphaphenanthrene-10-oxide was varied as shown in Table 5. The polybutyleneterephthalate resins thus obtained were analyzed in regard to mechanical properties, and the results are presented in Table 5.

TABLE 5

| | Composition Content of Phosphorus Flame Retardant[1] | Property | | | | |
|---|---|---|---|---|---|---|
| | | Intrinsic Viscosity (dl/g) | Tensile Strength (kg/cm$^2$) | Tensile Elongation (%) | Flexual Strength (kg/cm$^2$) | IZod Impact Strength (kg.cm/cm) |
| Example 1 | 3 | 1.14 | 540 | 100 | 870 | 4.4 |
| Example 15 | 7 | 0.98 | 560 | 70 | 900 | 3.8 |
| Example 16 | 15 | 0.74 | 450 | 20 | 930 | 3.0 |
| Comparative Example 1 | 0 | 0.98 | 540 | 200 | 900 | 4.6 |
| Comparative Example 7 | 7 | 0.55 | 300 | 5 | 850 | 2.1 |
| Comparative Example 8 | 35 | 0.51 | 280 | 4 | 800 | 2.2 |

Note:
[1]unit: part by weight

EXAMPLES 17 to 21 AND COMPARATIVE EXAMPLES 9, 10 AND 11

A glass-reinforced fiber (CS321 supplied by Kumkang Korea Chemicals Co.) was incorporated into the flame retardant polybutyleneterephthalate resins obtained in Examples 1, 15 and 16 and Comparative Examples 1, 9, 10 and 11 to prepare flame retardant polybutyleneterephthalate resin compositions.

In the resin compositions of the respective Examples and Comparative Examples, the type of the polybutyleneterephthalate resin and the mixing ratio with the glass-reinforced fiber were varied as shown in Table 6.

The flame retardant polybutyleneterephthalate resins thus obtained were analyzed in regard to limit oxygen index, tensile strength, flexural strength and Izod impact strength in the same manner as described above. The results are presented in

TABLE 6

| | Composition | | | Property | | | |
|---|---|---|---|---|---|---|---|
| | A | B | C | Limit Oxygen Index | Tensile Strength (kg/cm$^2$) | Flexural Strength (kg/cm$^2$) | IZod Impact Strength (kg.cm/cm) |
| Example 17 | Example 1 | 85 | 15 | 26 | 620 | 1050 | 5.2 |
| Example 18 | Example 15 | 85 | 15 | 27 | 630 | 1150 | 5.1 |
| Example 19 | Example 16 | 85 | 15 | 30 | 570 | 1100 | 4.3 |
| Example 20 | Example 15 | 70 | 30 | 28 | 1300 | 1850 | 5.4 |
| Example 21 | Example 15 | 55 | 45 | 28 | 1500 | 2150 | 5.8 |
| Comparative Example 9 | Comparative Example 1 | 85 | 15 | 24 | 630 | 1040 | 5.6 |
| Comparative Example 10 | Comparative Example 7 | 85 | 15 | 27 | 400 | 1000 | 3.0 |
| Comparative Example 11 | Comparative Example 8 | 85 | 15 | 32 | 390 | 980 | 3.2 |

Note)
A: Type of Flame Retardant PBT
B: Content of Flame Retardant PBT (wt %)
C: Content of Glass-reinforced Fiber (wt. %)

As can be seen from Tables 5 and 6, when incorporated with a predetermined amount of a reinforcing material such as glass-reinforced fiber, the polybutyleneterephthalate obtained by using a phosphorus-based flame retardant that has good properties in itself could be enhanced in the mechanical properties, including tensile strength flexual strength and Izod impact strength.

INDUSTRIAL APPLICABILITY

As described above the flame retardant polybutyleneterephthalate resin according to the present invention has excellencies in flame retardancy and processability, produces no toxic material such as dioxin during combustion and hardly deterioiates crystallinity and heat resistance solving the problems with the conventional preparation method of flame retardant polybutyleneterephthalate. Furthermore, incorporation of a metal catalyst or inorganic particles during polymerization or after the preparation of the resin may reduce a deterioration of the crystallization rate caused by the use of a phosphorus-based flame retardant. Incorporation of a reinforcing material into the resin thus obtained also prevents a deterioration of mechanical properties of the resin possibly caused by the use of the phosphorus-based flame retardant. The resin thus obtained is useful in various applications, including the frame, housing, socket and connector of electric/electronic equipment and office machines.

What is claimed is:

1. A flame retardant polybutyleneterephthalate resin prepared by:

(a) performing a transesterification reaction of a dicarboxylic acid or its ester derivative and a 1,4-butanediol to yield an oligomer;

(b) reacting the oligomer with 0.5 to 30 parts by weight of a phosphorus-based flame retardant represented by the following formula I with respect to 100 parts by weight of the dicarboxylic acid or its ester derivative; and (c) performing a polycondensation reaction in the presence of a polycondensation catalyst to prepare a polybutyleneterephthalate:

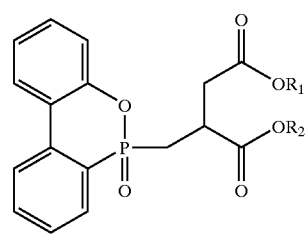

Formula I wherein $R_1$ and $R_2$ are same or different and are methyl or butyl including a hydroxyl group.

2. The flame retardant polybutyleneterephthalate resin as claimed in claim 1, wherein the phosphorus-based flame retardant represented by the formula I is added in an amount of 1 to 15 parts by weight with respect to 100 parts by weight of the dicarboxylic acid or its ester derivative.

3. The flame retardant polybutyleneterephthalate resin as claimed in claim 1, wherein the phosphorus-based flame retardant represented by the formula I is added during the transesterification or polycondensation reaction.

4. The flame retardant polybutyleneterephthalate resin as claimed in claim 1, wherein a catalyst of the transesterification reaction includes at least one selected from manganese acetate, zinc acetate, cobalt acetate, magnesium acetate, sodium acetate, lithium acetate, manganese hydroxide, zinc hydroxide, cobalt hydroxide, magnesium hydroxide, sodium hydroxide, and alkyltitanate having a $C_2$–$C_6$ alkyl substituent, which are used either alone or in combination of two or more.

5. The flame retardant polybutyleneterephthalate resin as claimed in claim 1, wherein the polycondensation catalyst includes at least one selected from antimony oxide, tin oxide, germanium dioxide, tetraalkyltitanate having a $C_2$–$C_6$ alkyl substituent, manganese acetate, zinc acetate, cobalt acetate, magnesium acetate, sodium acetate, and lithium acetate, which are used either alone or in combination of two or more.

6. The flame retardant polybutyleneterephthalate resin as claimed in claim 1, wherein the polybutyleneterephthalate resin has an Izod impact strength of more than 3 kg·cm/cm, a tensile strength of more than 400 kg/cm$^2$ and a tensile elongation of more than 10%.

7. The flame retardant polybutyleneterephthalate resin as claimed in claim 1, wherein the polybutyleneterephthalate resin has an intrinsic viscosity of more than 0.60 dl/g.

8. A flame retardant polybutyleneterephthalate resin prepared by:
(a) performing a transesterification reaction of a dicarboxylic acid or its ester derivative and a 1,4-butanediol to yield an oligomer;
(b) reacting the oligomer with 0.5 to 30 parts by weight of a phosphorus-based flame retardant represented by the following formula I with respect to 100 parts by weight of the dicarboxylic acid or its ester derivative and
(c) adding a deposited particle-forming material or an inorganic particle material and performing a polycondensation reaction in the presence of a polycondensation catalyst to prepare a polybutyleneterephthalate:

Formula I

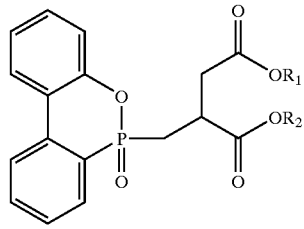

wherein $R_1$ and $R_2$ are different or the same and are methyl or butyl including a hydroxyl group.

9. The flame retardant polybutyleneterephthalate resin as claimed in claim 8, wherein the flame retardant polybutylencterephthalate resin has a linit oxygen index of more than 25, and a recrystallization peak area of less than 9.0 J/g and a melting peak area of more than 35 J/g that are measured after quenching in a thermal analysis.

10. The flame retardant polybutylenterephthalate resin as claimed in claim 8, wherein the deposited particle-forming material includes at least one selected from manganese acetate, zinc acetate, cobalt acetate, magnesium acetate, sodium acetate, lithium acetate, antimony oxide, tin oxide, and germanium dioxide, which are used either alone or in combination of two or more, the deposited particle-forming material being added in an amount of 0.001 to 5 wt. % in the resin.

11. The flame retardant polybutyleneterephthalate resin as claimed in claim 8, wherein the inorganic particle material is not added during the polycondensation reaction but separately added after the preparation of the resin.

12. The flame retardant polybutyleneterephthalate resin as claimed in claim 8, wherein the inorganic particle material includes at least one selected from titanium dioxide, calcium carbonate, talc, clay, mica, aluminum silicate, silica, calcium metasilicate, and alumina trihydrate, which are used either alone or in combination of two or more, the inorganic particle material having an average particle diameter of 0.1 to 100 μm and being added in an amount of 0.01 to 10 wt. % in the resin.

13. The flame retardant polybutyleneterephthalate resin as claimed in claim 11, wherein the inorganic particle material includes at least one selected from titanium dioxide, calcium carbonate, talc, clay, mica, aluminum silicate, silica, calcium metasilicate, and alumina trihydrate, which are used either alone or in combination of two or more, the inorganic particle material having an average particle diameter of 0.1 to 100 μm and being added in an amount of 0.01 to 10 wt. % in the resin.

14. The flame retardant polybutyleneterephthalate resin as claimed in claim 8, wherein the phosphorus-based flame retardant represented by the formula I is added in an amount of 1 to 15 parts by weight with respect to 100 parts by weight of the dicarboxylic acid or its ester derivative.

15. The flame retardant polybutyleneterephthalate resin as claimed in claim 8, wherein the phosphorus-based flame retardant represented by the formula I is added during the transesterification or polycondensation reaction.

16. The flame retardant polybutyleneterephthalate resin as claimed in claim 8, wherein a catalyst of the transesterification reaction includes at least one selected from manganese acetate, zinc acetate, cobalt acetate, magnesium acetate, sodium acetate, lithium acetate, manganese hyldroxide, zinc hydroxide, cobalt hydroxide, magnesium hydroxide, sodium hydroxide, and alkyltitanate having a $C_2$–$C_6$ alkyl substituent, which are used either alone or in combination of two or more.

17. The flame retardant polybutyleneterephthalate resin as claimed in claim 8, wherein the polycondensation catalyst includes at least one selected from antimony oxide, tin oxide, germanium dioxide, tetraalkyltitanate having a $C_2$–$C_6$ alkyl substituent, manganese acetate, zinc acetate, cobalt acetate, magnesium acetate, sodium acetate, and lithium acetate, which are used either alone or in combination of two or more.

18. A flame retardant polybutyleneterephthalate resin composition comprisinig 50 to 90 wt. % of a polybutyleneterephthalate resin and 10 to 50 wt. % of a reinforcing material.
the polybutyleneterephthalate resin being prepared by:
(a) performing a transesterification reaction of a dicarboxylic acid or its ester derivative and a 1,4-butanediol to yield an oligomer;
(b) reacting the oligomer with 0.5 to 30 parts by weight of a phosphorus-based flame retardant represented by the following formula I with respect to 100 parts by weight of the dicarboxylic acid or its ester derivative; and (c) performing a polycondensation reaction in the presence of a polycondensation catalyst to prepare a polybutyleneterephthalate, wherein the polybutyleneterephthalate resin has an Izod impact strength of more than 3 kg·cm/cm, a tensile strength of more than 400 kg/cm² and a tensile elongation of more than 10%:

Formula I

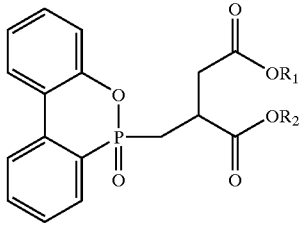

wherein $R_1$ and $R_2$ are different or the same and are methyl or butyl including a hydroxyl group.

19. The flame retardant polybutyleneterephthalate resin composition as claimed in claim 18, wherein the reinforcing material includes glass-reinforced fiber or carbon fiber.

20. The flame retardant polybutyleneterephthalate resin composition as claimed in claim 18, wherein the polybutyleneterephthalate resin has an Izod impact strength of more than 4 kg·cm/cm and a tensile strength of 500 kg/cm².

21. The flame retardant polybutyleneterephthalate resin composition as claimed in claim 18, wherein the polybutyleneterephthalate resin has a limit oxygen index of more than 26.

22. The flame retardant polybutyleneterephthalate resin composition as claimed in claim 18, wherein the polybutyleneterephthalate resin has an intrinsic viscosity of more than 0.60 dl/g.

23. The flame retardant polybutyleneterephthalate resin composition as claimed in claim 18, wherein the phosphorus-based flame retardant represented by the formula I is added in an amount of 1 to 15 parts by weight with respect to 100 parts by weight of the dicarboxylic acid or its ester derivative.

24. The flame retardant polybutyleneterephthalate resin composition as claimed in claim 18, wherein the phosphorus-based flame retardant represented by the formula I is added during the transesterification or polycondensation reaction.

25. The flame retardant polybutyleneterephthalate resin composition as claimed in claim 18, wherein a catalyst of the transesterification reaction includes at least one selected from manganese acetate, zinc acetate, cobalt acetate, magnesium acetate, sodium acetate, lithium acetate, manganese hydroxide, zinc hydroxide, cobalt hydroxide, magnesium hydroxide, sodium hydroxide, and alkyltitanate having a $C_2$–$C_6$ alkyl substituent, which are used either alone or in combination of two or more.

26. The flame retardant polybutyleneterephthalate resin composition as claimed in claim 18, wherein the polycondensation catalyst includes at least one selected from antimony oxide, tin oxide, germanium dioxide, tetraalkyltitanate having a $C_2$–$C_6$ alkyl substituent, manganese acetate, zinc acetate, cobalt acetate, magnesium acetate, sodium acetate, and lithium acetate, which are used either alone or in combination of two or more.

* * * * *